(12) United States Patent
Ersoy et al.

(10) Patent No.: US 6,308,942 B1
(45) Date of Patent: Oct. 30, 2001

(54) TWO-CHAMBER SUPPORT BEARING

(75) Inventors: Metin Ersoy, Walluf; Ernst-Günter Jördens, Damme, both of (DE)

(73) Assignee: ZF Lemförder Metallwaren AG (DE)

(*) Notice: Subject to any disclaimer, the term of this patent is extended or adjusted under 35 U.S.C. 154(b) by 0 days.

(21) Appl. No.: 09/719,077

(22) PCT Filed: Apr. 6, 2000

(86) PCT No.: PCT/DE00/01041

§ 371 Date: Jan. 11, 2001

§ 102(e) Date: Jan. 11, 2001

(87) PCT Pub. No.: WO00/60251

PCT Pub. Date: Oct. 12, 2000

(30) Foreign Application Priority Data

Apr. 7, 1999 (DE) ............................................. 199 15 480

(51) Int. Cl.$^7$ ..................................................... F16F 13/26
(52) U.S. Cl. ................................. 267/140.13; 267/140.14
(58) Field of Search .......................... 267/140.11, 140.13, 267/140.14; 248/550, 562, 636, 638

(56) References Cited

U.S. PATENT DOCUMENTS

| | | | | |
|---|---|---|---|---|
| 5,238,232 | * | 8/1993 | Kobayashi et al. | 267/140.14 |
| 5,297,781 | * | 3/1994 | Gennesseaux | 267/140.14 |
| 5,779,231 | * | 7/1998 | Okazaki et al. | 267/140.14 |
| 6,059,275 | * | 5/2000 | Muramatsu | 267/140.14 |

* cited by examiner

Primary Examiner—Christopher P. Schwartz
(74) Attorney, Agent, or Firm—McGlew and Tuttle, P.C.

(57) ABSTRACT

A two-chamber step bearing with hydraulic damping especially for mounting engines of motor vehicles is presented. It has at least one fluid-filled working chamber and at least one compensating chamber connected to same by a nozzle channel of variable cross section. The cross section of the nozzle channel is changed by means of a first motor-powered actuating drive. The working chamber is provided with a buckling spring, which is integrated in its walls and whose stiffness can be changed by means of a second motor-powered actuating drive. The second motor-powered actuating drive is independent from the first actuating drive. Due to the described design embodiment the two-chamber step bearing can be continuously adapted during the operation of the two-chamber step bearing to both the damping of low-frequency vibrations of large amplitude and the damping of high-frequency vibrations of small amplitude. The bearing is an especially compact and inexpensive design.

12 Claims, 3 Drawing Sheets

TWO-CHAMBER SUPPORT BEARING

FIELD OF THE INVENTION

The present invention pertains to a two-chamber step bearing with hydraulic damping especially for mounting engines of motor vehicles, which has at least one fluid-filled working chamber and at least one compensating chamber connected to same by a nozzle channel of variable cross section.

BACKGROUND OF THE INVENTION

An engine bearing of this type has been known from, e.g., DE 36 14 161. In the two-chamber step bearing disclosed in this document, the working chamber and the compensating chamber are provided with walls consisting of ring-shaped rubber membranes, which have a predetermined buckling characteristic adapted to the operating load.

The compensating chamber and the working chamber are connected to one another by a nozzle chamber, whose walls are formed by corresponding profiles overlapping one another in two rigid components adjustable in relation to one another, wherein the two components are axially adjustable in relation to one another by means of a screwable adjusting member, which is mounted coaxially to the principal axis of the bearing and is fixed in the axial direction in the bearing housing of the two-chamber step bearing and can be actuated by means of a component projecting from the housing.

The adjustment of the nozzle channel cross section is performed by means of a spindle, which is mounted freely rotatably in the bearing housing, wherein one of the two components forming the nozzle channel is in threaded engagement with the spindle for the axial adjustment, so that a reduction or enlargement of the nozzle channel cross section can be brought about by rotating the spindle.

Even though a certain adjustment of the two-chamber step bearing to the design requirements of the engine, whose vibrations are to be damped by the bearing, is possible due to the exclusively manual adjustability of the two-chamber step bearing by means of the component projecting from the housing, adjustment during the running operation is ruled out because of the existing installation conditions.

Moreover, an additional stiffness of the fluid cushion in the working chamber, which is desirable because of different operating states, is not possible in the two-chamber step bearing disclosed in the above-mentioned document. However, precisely the combination of influencing both the nozzle cross section and the damping capacity of the hydraulic cushion within the working chamber would make possible a much better adaptation of the two-chamber step bearing to the different operating conditions of the engines to be mounted within motor vehicles. Such an adaptation is required especially in the case of the use of direct injection diesel engines, which are frequently used now, and whose vibration characteristics are determined by different vibration characteristics at idle and during travel with different vibration frequencies far more greatly than in the case of the gasoline and diesel engines that have been used hitherto.

In the two-chamber step bearing known from the state of the art, an increase in the channel cross section leads to an increase in the damping of the bearing, without a change in the frequency level or the dynamic stiffness of the bearing. This increase in damping is quite important for the elimination of low-frequency high-amplitude vibrations.

However, the additionally occurring high-frequency vibrations with small amplitudes can be effectively controlled only by changing the stiffness of the ring-shaped rubber membrane or of the fluid cushion cooperating with same.

SUMMARY AND OBJECTS OF THE INVENTION

The object of the present invention is therefore to improve a two-chamber step bearing of this type based on the state of the art such that a change in the damping characteristic is made possible during the operating state, where both low-frequency vibrations of large amplitude and vibrations of a higher frequency with a correspondingly lower amplitude are to be effectively damped.

Another object is to make the two-chamber step bearing of this type compact in terms of the mounting space and to guarantee reliable operation under all operating conditions.

This object is accomplished according to the present invention by the cross section of the nozzle channel being changed by means of a first motor-powered actuating drive and by the working chamber being provided with a buckling spring integrated in one of its walls, whose stiffness can be varied by means of a second motor-powered actuating drive that is independent from the first actuating drive.

This design according to the present invention makes it possible, for the first time ever, to rapidly and reliably adapt a two-chamber step bearing of this type to the different operating conditions of a motor vehicle. Both the occurring high-frequency vibrations with low amplitude and low-frequency vibrations of a correspondingly higher amplitude can be effectively eliminated by the use of the actuating drives and the resulting change in the damping characteristic of the two-chamber step bearing according to the present invention. Another essential advantage of the present invention is that, for the first time ever, both the nozzle cross section and at the same time the damping characteristic of the hydraulic cushion can be changed.

Another advantage arising in connection with the installation of such a two-chamber step bearing according to the present invention is that no additional special connections are to be provided besides electric supply lines for the actuating drives.

It has proved to be particularly expedient to arrange both actuating drives in the direction of the principal axis of the bearing coaxially one on top of another, wherein both actuating drives have actuating members designed as electric motor-driven threaded spindles. One of the threaded spindles is designed here as a hollow spindle provided with a central through hole, in the through hole of which the other threaded spindle is arranged. This design embodiment guarantees an especially space-saving design of the actuating drives and makes possible a completely independent simultaneous or separate control of both the nozzle channel cross section and the damping properties of the hydraulic cushion.

The use of electric stepping motors as actuating drives makes possible an especially sensitive change of the setting parameters, and no concessions need to the made in terms of the compactness of the design.

Another essential advantage of the present invention arises from the feature that the nozzle channel between the working channel and the compensating channel extends in a plane located at right angles to the principal axis of the bearing helically around the principal bearing axis. A gentle transition is guaranteed by this design between the channel inlet opening into the working chamber and the channel outlet opening into the compensating chamber, which makes possible the turbulence-free entry and discharge of the fluid, but is also advantageous especially for the service life of the closing membrane forming the lower closure of the working chamber and extending into the channel cross section.

An exemplary embodiment of the subject of the present invention will be explained in greater detail below on the basis of the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
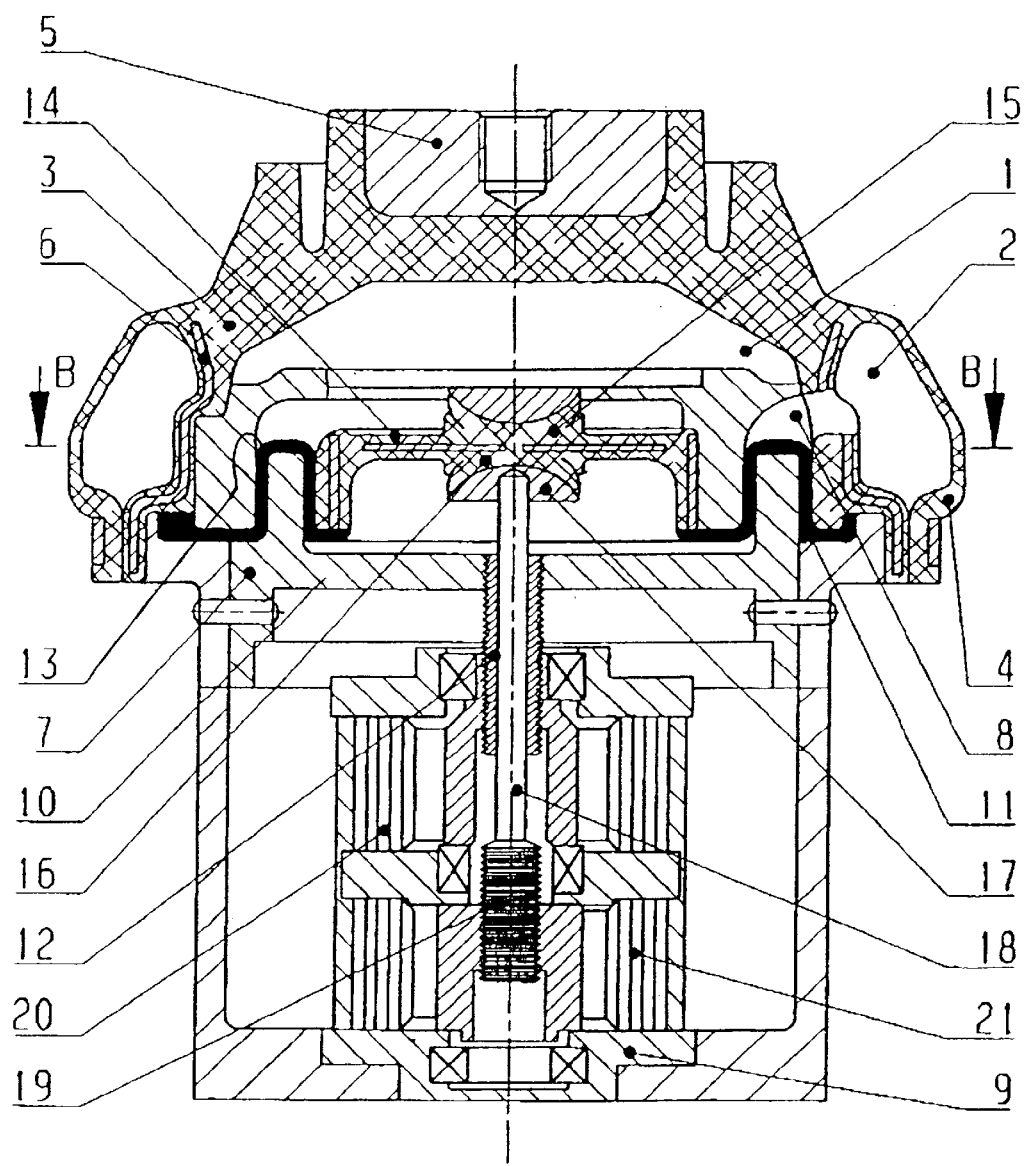
FIG. 1 is a longitudinal sectional view through a two-chamber step bearing according to the present invention, in which the operating situation is represented with the setting of a small channel cross section and high stiffness of the hydraulic cushion.

Referring to the drawings in particular, the exemplary embodiment has a two-chamber step bearing with hydraulic damping, especially an engine bearing in motor vehicles, which has a working chamber 1 filled with fluid, a compensating chamber 2 located concentrically on the outside coaxially around the working chamber 1, and a ring-shaped rubber wall 3 separating the two chambers. The compensating chamber 2 is closed from the outside of the two-chamber step bearing by an additional rubber membrane 4. The two rubber parts 3 and 4 are made in one piece and are adherently connected to an upper centrally arranged carrier element 5, which can be fastened to the engine or another part to be supported. The rubber wall 3 forming the wall of the working chamber 1 is connected by its lower, free end facing away from the carrier element 5 to a component 6, in which the nozzle channel 8 is milled and is screwed to a ring-shaped bottom part. The bottom part 7 has a pot-shaped design and has a bottom plate 9, which is designed for fastening to a mount arranged on the vehicle body. A piston component 10, which has a projection 11 designed corresponding to the nozzle channel 8 in its spiral shape on its top side facing away from the bottom plate 9, extends from the bottom side into the nozzle channel 8 provided in the component 6 as a spiral-shaped recess. The piston component 10 is provided with a central hole, into which a hollow spindle 12 is screwed down. The hollow spindle 12 is part of a first actuating drive 20, whose rotary movement brings about an extension and withdrawal of the hollow spindle 12 and as a result a linear withdrawal and extension of the piston component 10 in the nozzle channel 8.

The nozzle channel 8 milled into the component 6 is sealed against the piston component 10 by a membrane 13. This membrane 13 forms at the same time the lower closure of the working chamber 1 and is stiffened with a buckling spring 14 provided in one piece with the membrane. The buckling spring 14 comprises a shim and two projections 15 and 16. The projections 15 and 16 are made in one piece with the membrane 13 above and under the buckling spring 14 incorporated centrally in the membrane 13. The projection 16 located outside the working chamber 1 can be compressed by a pressing plate 17, as is illustrated in FIG. 1. The pressing plate 17 is rigidly connected to a threaded spindle 18, which is part of a second actuating drive 21 and is led through a central through hole 19 of the hollow spindle 12. Rotation of the actuating drive 21 brings about an extension and withdrawal of the threaded spindle 18 from and into the actuating drive, where, as is apparent from FIG. 1, extension of the threaded spindle brings about the application of pressure and consequently stiffening of the buckling spring 14 by the pressing plate 17.

Figure 2:
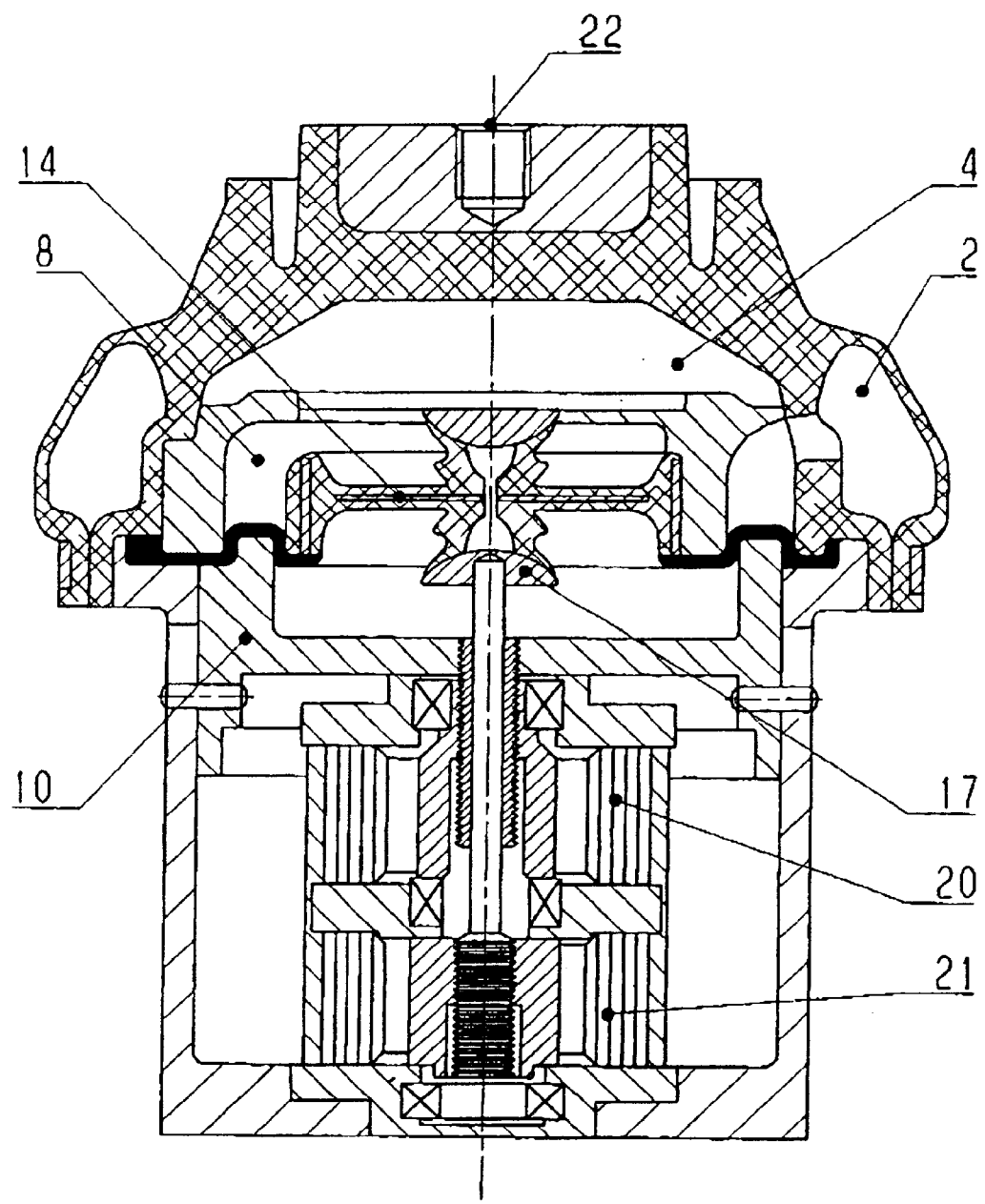
FIG. 2 is a sectional view corresponding to FIG. 1, in which a large nozzle cross section and low stiffness of the hydraulic cushion are set by the actuating drives.

Contrary to FIG. 1, FIG. 2 shows the positions of the stepping motors 20 and 21 in which the pressing plate 17 does not exert a pressing force on the buckling spring 14 and, moreover, the piston component 10 has not entered the nozzle channel 8 of the component 6. Thus, the two figures illustrate the opposite end positions of both the piston component 10 and the pressing plate 17, where the individual actuation of the actuating drives 20 and 21 makes, of course, possible any desired intermediate positions of the piston component 10 and of the pressing plate 17 independently from one another. The different positions bring about different nozzle cross sections of the nozzle channel 8 and different stiffness of the buckling spring 14, so that the two-chamber step bearing according to the present invention can be optimally adapted to all operating conditions depending on the required damping characteristic.

Figure 3:
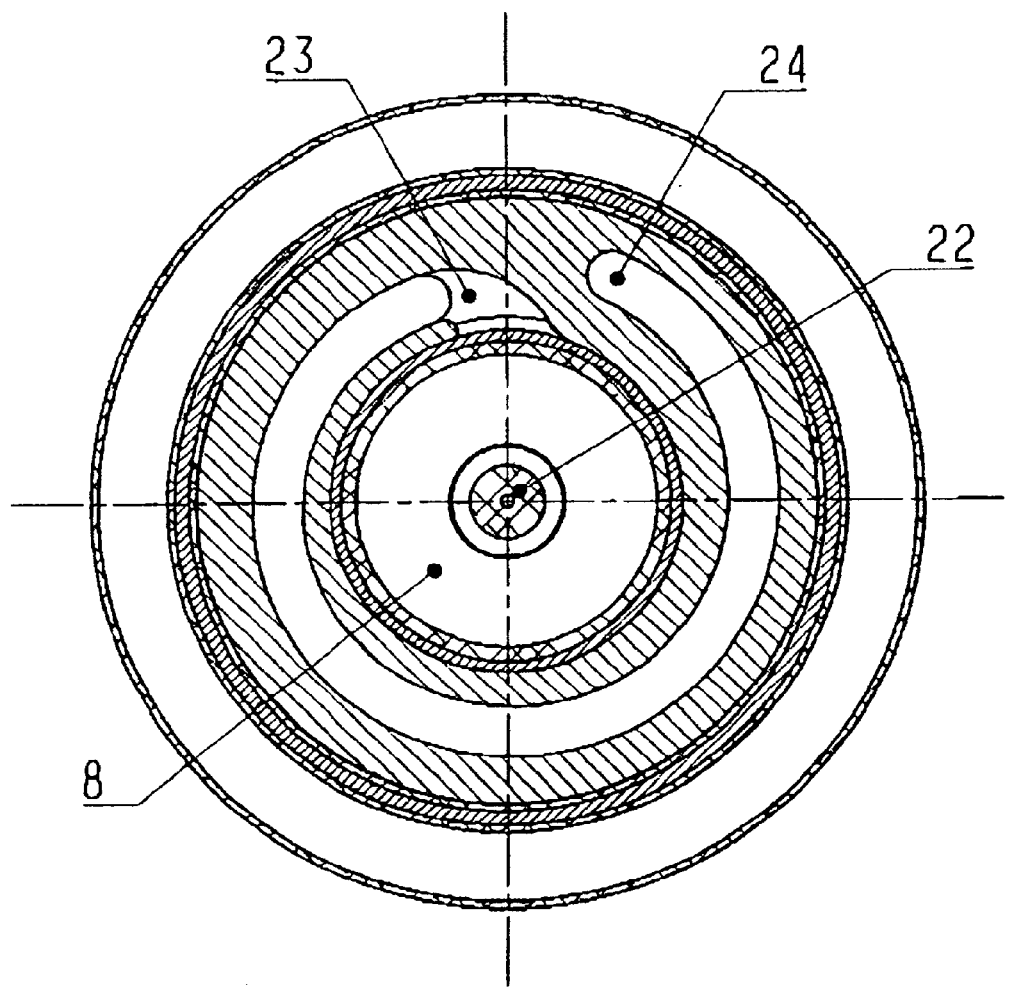
FIG. 3 is a sectional view corresponding to line B—B in FIG. 1 at the level of the nozzle channel.

It can be clearly recognized from the sectional view in FIG. 3 that the nozzle channel 8 provided in the component 6 has a shape extending helically around the principal axis 23 of the bearing. Due to this design, the inlet 23 of the nozzle channel 8, which inlet opens into the working chamber 1, and the outlet 24 of the nozzle channel 8, which outlet points toward the compensating chamber 2, are located offset in relation to one another.

This offset, which is brought about by the spiral shape of the nozzle channel 8, has an extraordinarily favorable effect on the service life of the membrane 13 sealing the nozzle channel, because it is not stressed unduly especially in the area of the inlets and outlets.

The actuating drives shown in FIGS. 1 and 2 are designed as electric stepping motors which guarantee an extremely compact design, on the one hand, and guarantee a sensitive and programmable extension and withdrawal of both the threaded spindle 18 and the hollow spindle 12, on the other hand, so that the overall damping characteristic of the two-chamber step bearing according to the present invention can be adapted highly accurately to a required damping characteristic in broad ranges.

The actuating drives can be controlled by means of characteristics in a simple and inexpensive manner, and the electric stepping motors used can have high adjusting speeds in a range higher than 100 mm per sec.

While specific embodiments of the invention have been shown and described in detail to illustrate the application of the principles of the invention, it will be understood that the invention may be embodied otherwise without departing from such principles.

What is claimed is:

1. A two-chamber step bearing with hydraulic damping for mounting engines of motor vehicles, the bearing comprising:

at least one fluid-filled working chamber;

at least one compensating chamber;

a nozzle channel of variable cross section connecting said at least one fluid-filled working chamber to said at least one compensating chamber;

a first motor-powered actuating drive for changing the cross section of said nozzle channel;

a second motor-powered actuating drive which is independent from the said first actuating drive;

a buckling spring provided with said working chamber, said buckling spring being integrated in a wall of said working chamber and said buckling spring having a stiffness that can be changed by means of said second motor-powered actuating drive, wherein said first motor-powered actuating drive and said second motor-powered actuating drive are arranged coaxially one on top of another in a direction of a principal axis of the bearing.

2. A two-chamber step bearing with hydraulic damping in accordance with claim 1, wherein both said first motor-powered actuating drive and said second motor-powered actuating drive have actuating members designed as electric motor-driven threaded spindles, wherein one of said threaded spindles is a hollow spindle, which is provided with a central through hole, another threaded spindle being arranged in said central through hole.

3. A two-chamber step bearing with hydraulic damping in accordance with clam 1, wherein said first motor-powered actuating drive and said second motor-powered actuating drive are electric stepping motors.

4. A two-chamber step bearing with hydraulic damping in accordance with claim 1, wherein said nozzle channel between said working chamber and said compensating chamber extends in a plane located at right angles to a bearing principal axis helically around said bearing principal axis.

5. A bearing with hydraulic damping, the bearing comprising:

walls defining a fluid-filled working chamber;

walls defining a compensating chamber;

a nozzle channel of variable cross section connecting said working chamber to said compensating chamber;

a first motor-powered actuating drive for changing the cross section of said nozzle channel;

a second motor-powered actuating drive which is independent from the said first actuating drive;

a buckling spring provided with said working chamber, said buckling spring being integrated in at least one of said walls of said working chamber and said buckling spring having a stiffness that can be changed by means of said second motor-powered actuating drive, wherein said first motor-powered actuating drive and said second motor-powered actuating drive are arranged coaxially one on top of another in a direction of a principal axis of the bearing.

6. A bearing with hydraulic damping in accordance with claim 5, wherein each of said first motor-powered actuating drive and said second motor-powered actuating drive have actuating members including electric motor-driven threaded spindles, wherein one of said threaded spindles is a hollow spindle, which is provided with a central through hole, another threaded spindle being arranged in said central through hole.

7. A bearing with hydraulic damping in accordance with claim 5, wherein said first motor-powered actuating drive and said second motor-powered actuating drive are electric stepping motors.

8. A bearing with hydraulic damping in accordance with claim 5, wherein said nozzle channel between said working chamber and said compensating chamber extends in a plane located at right angles to a bearing principal axis helically around said bearing principal axis.

9. A two-chamber step bearing with hydraulic damping for mounting engines of motor vehicles, the bearing comprising:

at least one fluid-filled working chamber;

at least one compensating chamber;

a nozzle channel of variable cross section connecting said at least one fluid-filled working chamber to said at least one compensating chamber;

a first motor-powered actuating drive for changing the cross section of said nozzle channel;

a second motor-powered actuating drive which is independent from the said first actuating drive;

a buckling spring provided with said working chamber, said buckling spring being integrated in a wall of said working chamber and said buckling spring having a stiffness that can be changed by means of said second motor-powered actuating drive, wherein both said first motor-powered actuating drive and said second motor-powered actuating drive have actuating members designed as electric motor-driven threaded spindles, wherein one of said threaded spindles is a hollow spindle, which is provided with a central through hole, said other threaded spindle being arranged in said central through hole.

10. A two-chamber step bearing with hydraulic damping in accordance with claim 9, wherein said first motor-powered actuating drive and said second motor-powered actuating drive are arranged coaxially one on top of another in a direction of a principal axis of the bearing.

11. A two-chamber step bearing with hydraulic damping in accordance with claim 9, wherein said nozzle channel between said working chamber and said compensating chamber extends in a plane located at right angles to a bearing principal axis helically around said bearing principal axis.

12. A two-chamber step bearing with hydraulic damping in accordance with claim 9, wherein said first motor-powered actuating drive and said second motor-powered actuating drive are electric stepping motors.

\* \* \* \* \*